Sept. 28, 1965   J. R. SCHUETZ   3,208,221
HYDRAULIC OPERATING APPARATUS
Filed Sept. 30, 1963
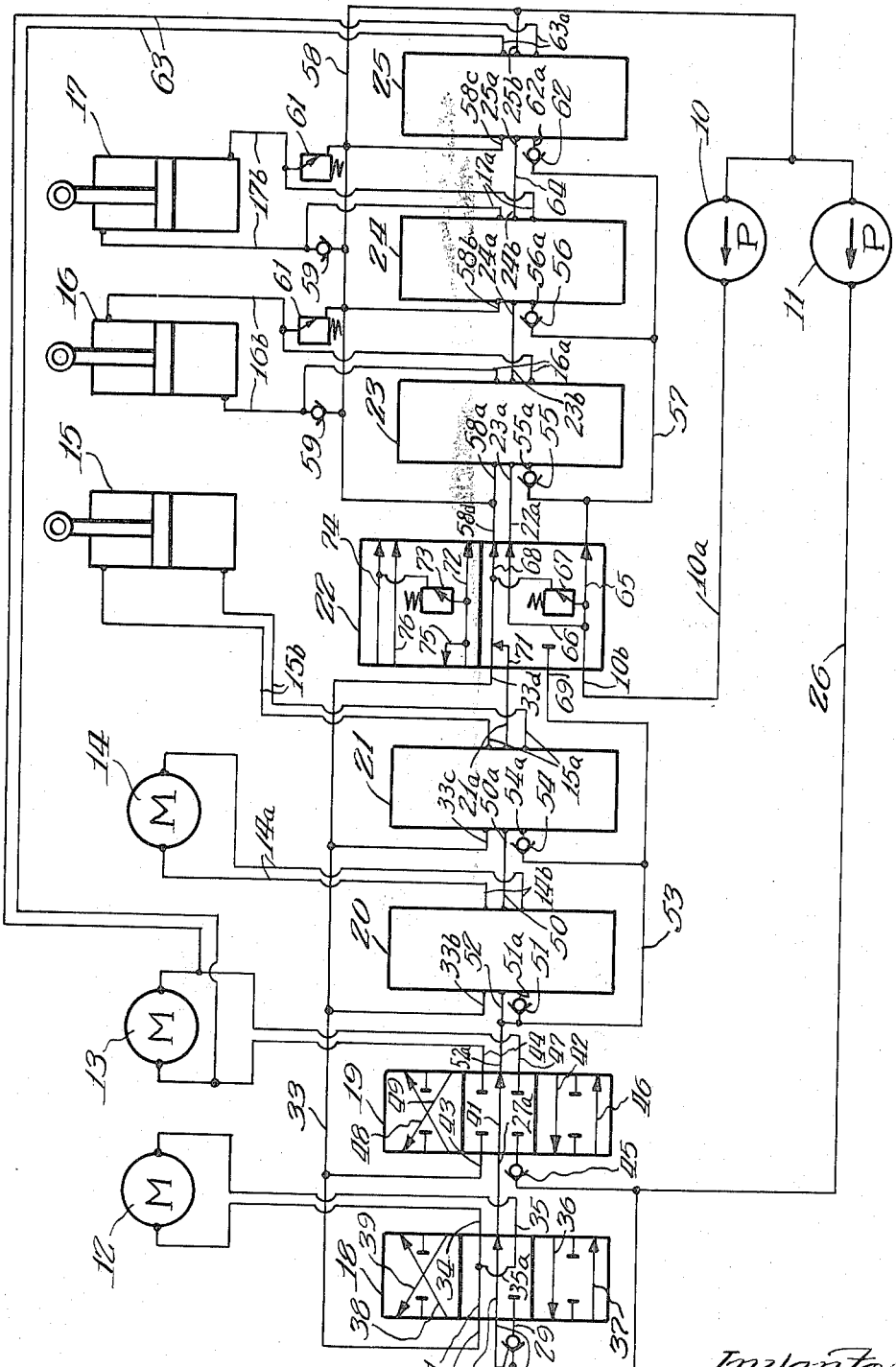
Inventor:
John R. Schuetz
By Bair, Freeman + Molinare Attys.

United States Patent Office 3,208,221
Patented Sept. 28, 1965

3,208,221
HYDRAULIC OPERATING APPARATUS
John R. Schuetz, Wausau, Wis., assignor to Drott Manufacturing Corporation, Milwaukee, Wis., a corporation of Wisconsin
Filed Sept. 30, 1963, Ser. No. 312,600
9 Claims. (Cl. 60—52)

This invention relates to hydraulic operating apparatus and more particularly to a hydraulic system for powering and controlling various functions of self-propelled material handling units.

Material handling units have heretofore been proposed in which all of the operations, including propulsion of the vehicle, are powered hydraulically through one or more motor driven pumps on the vehicle. For example, self-propelled wheeled vehicles, either of the pneumatic type or the track laying type whose wheels are driven through hydraulic motors may carry shovels, hoes, buckets, or the like, whose various operating movements are effected by hydraulic motors supplied with actuating fluid by the same pumps.

For most efficient operation, it is desirable that the hydraulic power available be controllable so that it can all be applied to low speed high torque or high speed low torque propulsion of the vehicle, can be divided between propulsion of the vehicle and operation of the material handling devices on the vehicle or can all be applied to low speed high torque or high speed low torque operation of the material handling devices.

It is accordingly a primary object of the present invention to provide hydraulic operating apparatus which accomplishes these several purposes.

Another object is to provide hydraulic operating apparatus in which two pumps are selectively connectable to two driving motors respectively or both to one driving motor, to different operating motors respectively or in parallel to the several operating motors or one to one driving motor and the other to the operating motors.

A further object is to provide hydraulic operating apparatus capable of providing a wide range of operating conditions with a minimum number of relatively simple valves.

The above and other objects and features of the invention will be more readily apparent from the following description when read in connection with the accompanying drawing, in which:

The single figure is a diagrammatic view of an operating apparatus embodying the invention.

As shown in the drawing, all of the operations of a self-propelled vehicle equipped with material handling devices are powered hydraulically by two pumps 10 and 11 which may be driven by an internal combustion engine on the vehicle or by other suitable power means. The pumps are adapted to supply operating fluid to a pair of rotary hydraulic driving motors 12 and 13 which are connected respectively through suitable transmissions to different driving axles on the vehicle. In a conventional four-wheeled vehicle, for example, the driving motor 12 might be connected to the front steerable wheels through a differential and universal joints while the motor 13 might be connected to the rear wheels in a similar fashion.

The material handling device on the vehicle is controlled by a series of hydraulic motors one of which, 14, is a rotary motor generally similar to the driving motors 12 and 13. Normally in such vehicles the material handling device is mounted on the vehicle for rotation about a vertical axis and the motor 14 may be connected to the device to turn it about such axis. Other movements of the material handling device may be controlled by piston and cylinder type motors 15, 16 and 17. These motors, for example, might be used respectively to manipulate the tool on the supporting boom and to control crowding and raising and lowering of the boom. It will be understood that where additional movements of the material handling device are required additional motors similar to the motors 15, 16 and 17 could be provided for this purpose. The several hydraulic motors are controlled by a series of valves 18, 19, 20, 21, 22, 23, 24 and 25. These valves may be controlled manually either by direct mechanical manipulation or through hydraulically powered valve operated motors. Since the exact manner of moving the valves does not, per se, form a part of the present invention, the mechanism for moving the valves has not been illustrated.

The valve 18, as shown, is a three-position valve which is illustrated in its neutral position. In the neutral position of the valve fluid supplied from the pump 11 through a line 26 to a port 26a enters in a central passage 27 in the valve and flows straight through it to a line 27a. Fluid from the line 26 is also supplied past a check valve 28 to a port 29 which is closed in the neutral position of the valve. The valve is provided with an upper passage 31 which communicates with a return line 33 through a port 33a. At its outlet side, the valve is provided with two ports 34 and 35 which in the neutral position of the valve are interconnected by a passage 35a. These ports 34 and 35 communicate respectively with opposite sides of the driving motor 12, as shown.

When the valve 18 is shifted upwardly the ports 33a and 34 are connected by a passage 36 and the ports 29 and 35 are similarly connected through a passage 37. In this position of the valve the passage 27 is blocked. At this time, actuating fluid from the pump 11 will be supplied through port 29, passage 37 and port 35 to one side of the driving motor 12 and return fluid will flow through port 34, passage 36 and port 33a to the return line 33.

For reverse operation of the motor 12, the valve 18 is shifted to its downward position in which the ports 29 and 34 are connected through a passage 38 and the ports 33a and 35 are connected through a cross passage 39. At this time, fluid entering the port 29 will flow through the port 34 to the other side of the motor 12 and fluid will return from the motor through port 35 and cross passage 39 to the port 33a to run the motor in reverse.

The valves 19, 20, 21, 23, 24 and 25 are identical and only the valve 19 has been shown in detail. This is also a three-position valve which is illustrated in its neutral position. In this position, a passage 41 in the central part of the valve body is in communication with the passage 27 in valve 18 through line 27a and with a central discharge port 52a so that fluid from the pump 26 can flow straight through the several valves when they are all in their neutral positions. All other pasages through the valve are blocked.

When the valve 19 is shifted upwardly an upper passage 42 establishes communication between a port 43 which is connected to the return line 33 and a port 44 which is connected to one side of the motor 13. Fluid from the line 26 is supplied to the valve 19 through a check valve 45 and flows through a passage 46 to a port 47 which communicates with the opposite side of the motor. Thus when the valve 19 is shifted upwardly fluid will be supplied to the motor 13 to drive it in one direction.

When the valve 19 is shifted downwardly fluid will be supplied to the motor 13 through cross passages 48 and 49 to drive the motor in the reverse direction.

The valve 20 is connected to the hydraulic motor 14 through lines 14a and ports 14b in a manner similar to the connections of valve 19 to the hydraulic motor 13 and has a central discharge port 50 connected to a port 50a for valve 21. A return port 33b connects to return line 33. This valve is not connected directly to the supply line 26, but has its inlet port 51a connected through a check valve 51 to a line 52 extending from the central port 52a of the valve 19 and also to a line 53.

The valve 21 has a supply port 54a connected to line 53 through a check valve 54 and a return port 33c connected to return line 33. Discharge ports 15a are connected through lines 15b to the opposite ends of the motor 15. A central discharge port 21a is connected to a port 71 in valve 22.

Valve 23 has a supply port 55a connected to a supply line 57 through a check valve 55, a return port 58a connected to return line 58, which may lead directly to the inlets of pumps 10 and 11 or to a sump, and a central port 23a. Discharge ports 16a are connected through lines 16b to opposite ends of motor 16. A central discharge port 23b is connected to a supply port 24a on valve 24. The valve 24 has a supply port 56a connected to line 57 through a check valve 56, a return port 58b connected to return line 58, which may lead directly to the inlets of pumps 10 or 11 or to a sump, and a central port 24a. Discharge ports 17a are connected through lines 17b to opposite ends of motor 17. A central discharge port 24b is connected to a supply port 25a on valve 25.

In each of the motors 16 and 17 a check valve 59 is provided between one end of the motor and the return line 59 opening toward the motor. In the case of motor 16, which is used for crowding the material handling device, the check valve is connected to the lower or larger end of the motor so that material handling device can move outwardly during a crowding operation. In the course of the motor 17 the check valve 59 is connected to the upper or smaller end of the motor to open when the material handling device is being lowered rapidly to prevent cavitation in the upper end of the motor. Pressure relief valves 61 are connected between the opposite ends of the motors 16 and 17, respectively, and the return line 58 to open in response to a predetermined pressure. These valves will limit the force which can be exerted by the motors 16 and 17 thereby preventing possibility of damage to the parts.

The valve 25 has its inlet port 62a connected to the line 57 through a check valve 62, has a return port 58c connected to return line 58 and has it controlled ports 63a connected through lines 63 to driving motor 13. A central discharge port 25b connects to return line 58.

The valve 22 is a two-position valve and is illustrated in its upper position. In this position the pump 10 is connected through line 10a and port 10b and through passage 65 in the valve to the line 57 with a communicating passage 66 in the valve connected through a port 22a to the port 23a. A pressure relief valve 67 connects the passage 65 to a through passage 68 which interconnects the return lines 33 and 58 through ports 33d and 58d. The line 53 terminates in a blocked port 69. The port 71 connects the port 21a to the passage 68.

In the lower position of valve 22 there is a through passage 72 corresponding to the passage 65 and which is connected through a pressure relief valve 73 to an upper through passage 74 corresponding to the passage 68. In addition, there is a passage 75 to connect the port 69 and line 53 to the passage 72 and a second through passage 76 to connect the ports 71 and 22a.

In operation, with the valves in the neutral position as shown, none of the motors will be energized. At this time, fluid pumped by the pump 10 will flow through the passage 65, the offset passage 66 and the through passages in the valves 23, and 24 and 25 back to the return line. Fluid pumped by the pump 11 will flow through the central passages 27 and 41 in valves 18 and 19 and the similar passages in valves 20 and 21, through the port 71 in valve 22 to the passage 68 and return line 58.

For low speed high torque four-wheel drive in the forward direction, the valve 18 is moved upwardly and the valve 25 is slightly moved upwardly. At this time, fluid from the pump 10 will flow through the passage 65 in the valve 22, line 57, port 62a valve 25, one of the ports 63a and line 63 to the driving motor 13 to operate it in a forward direction. Simultaneously fluid will flow from pump 11 through line 26 and valve 18 to the driving motor 12 to operate it in a forward direction. Thus both of the driving motors will be energized from the pumps respectively to drive the driving axles of the vehicle with maximum torque. For reverse drive the valves 18 and 25 are moved downward to supply the motors with fluid in the opposite direction.

For high speed two-wheel drive, the valve 19 is moved upwardly with the valve 25 remaining in its upper position and valve 18 is moved to its neutral position. At this time, fluid from the pump 10 will continue to be supplied to the driving motor 13 through the valve 25 and fluid from the pump 11 will also be supplied to the driving motor 13 through the valve 19. Thus the motor 13 will be driven at maximum speed for high speed operation of the vehicle.

When it is desired to operate the vehicle and simultaneously to move the material handling device thereon, the valve 19 may be moved either upwardly or downwardly, depending upon which direction it is desired to drive the vehicle and the valve 22 may be moved to its downward position. At this time, fluid from the pump 11 will be supplied through the valve 19 to the driving motor 13 to drive the vehicle. Fluid from the pump 10 will be supplied to the passage 72 in valve 22 and from it to the line 57 to the valves 23, 24 and 25. Simultaneously fluid from the pump 10 may flow through the passage 75 into the line 53 to supply the valves 20 and 21. Thus the fluid from the pump 11 is utilized to drive the vehicle while fluid from the pump 10 may be utilized to supply any or all of the motors 14 to 17 to operate the material handling device.

For normal speed operation of the material handling device with the vehicle stationary the valves 18, 19 and 22 may remain in the positions shown. At this time, fluid from the pump 10 is supplied through the valve passage 65 to the line 57 and may be directed through the valves 23 and 24 to the motors 16 and 17. Fluid from the pump 11 is supplied through the passages 27 and 41 in the valves 18 and 19 registering with line 52 to the line 53 which connects to the valves 20 and 21. These valves may therefore direct fluid from the pump 11 to the motors 14 and 15 for operation thereof.

For high speed manipulation of the material handling device, the valves 18 and 19 may remain in their neutral positions with the valve 22 being shifted to its lowered position. At this time, fluid from the pump 10 will be supplied to the passage 72 from which it can flow to the valves 23 and 24 or through the passage 75 and line 53 to the valves 20 and 21. At the same time, fluid from the pump 11 will flow through the central passages 27 and 41 in valves 18 and 19 and line 52 to the line 53 which communicates with the passage 75 in the valve 22. Thus the pumps 10 and 11 are connected in parallel to the supply lines for the control valves 20, 21, 23 and 24 so that all of the fluid from both pumps can be supplied to any one or more of the motors simultaneously to effect high speed operation.

It will be seen that by the present invention a high degree of flexibility of operation of the vehicle itself and the material handling device thereon can be achieved with a relatively simple control circuit.

While one embodiment of the invention has been shown and described herein, it will be understood that it is illustrative only and not to be taken as a definition of the scope of the invention, reference being had for this purpose to the appended claims.

What is claimed is:

1. Hydraulic operating apparatus for a wheeled vehicle having material handling means thereon comprising hydraulic driving means for driving the vehicle, hydraulic operating means for the material handling means, two hydraulic pumps on the vehicle, and control valves connecting the pumps to the driving means and to the operating means, the control valves being positionable to effect a first operating condition in which both pumps are connected to the driving means to supply actuating fluid thereto, a second operating condition in which one pump is connected to the driving means and the other to the operating means, and a third operating condition in which both pumps are connected to the operating means.

2. The hydraulic operating apparatus of claim 1 in which the operating means comprises a plurality of hydraulic motors to which both pumps are connected in parallel in the third operating condition of the control valves and the control valves being positionable to effect a fourth operating condition in which one of the pumps is connected to part only of the hydraulic motors and the other pump is connected to the remainder of the hydraulic motors.

3. Hydraulic operating apparatus for a wheeled vehicle having material handling means thereon comprising hydraulic driving means for driving the vehicle, hydraulic operating means for the material handling means, two hydraulic pumps on the vehicle, a first control valve connected to one of the pumps and operable to direct fluid therefrom selectively to the driving means or to the operating means, a second control valve connected to the other pump to direct fluid therefrom to the driving means or to cut off fluid therefrom, valves connected to the other pump to direct fluid therefrom to the operating means, and a third control valve to connect the pumps in parallel to each other or to separate them from each other.

4. Hydraulic operating apparatus for a wheeled vehicle having material handling means thereon comprising hydraulic driving means for driving the vehicle, a plurality of hydraulic motors for causing different operations of the material handling means, two hydraulic pumps on the vehicle, a first control valve connected to one of the pumps and operable to direct fluid therefrom selectively to the driving means or to a first fluid supply line for a part only of the motors, a second fluid supply line for the remainder of the motors connected to the other pump, a second control valve to direct fluid from the second supply line to the driving means, and a third control valve to interconnect the first and second fluid supply lines.

5. Hydraulic operating apparatus for a wheeled vehicle having material handling means thereon comprising two hydraulic driving motors for driving different wheels on the vehicle, a plurality of hydraulic operating motors for causing different operations of the material handling means, two hydraulic pumps on the vehicle, and control valves controlling connection of the pumps to the driving and operating motors, the control valves being positionable to effect one operating condition in which the pumps are connected to the driving motors respectively, a second operating condition in which both pumps are connected to one of the driving motors, and a third operating condition in which both pumps are connected to the operating motors.

6. The hydraulic operating apparatus of claim 5 in which both pumps are connected in parallel to the operating motors in said third operating condition and the control valves are positionable to effect a fourth operating condition in which one of the pumps is connected to a part only of the operating motors and the other pump is connected to the remaining operating motors.

7. The hydraulic operating apparatus of claim 5 in which the control valves are positionable to effect a fourth operating condition in which one of the pumps is connected to one of the driving motors and the other pump is connected to the operating motors.

8. Hydraulic operating apparatus for a wheeled vehicle having material handling means thereon comprising two hydraulic driving motors for driving different wheels on the vehicle, a plurality of hydraulic operating motors for causing different operations of the material handling means, two hydraulic pumps on the vehicle, operating valves for the operating motors respectively, a pair of fluid supply lines connected respectively to different ones of the operating valves, a first control valve connected to one of the pumps and one of the driving motors to supply fluid from the pump to the driving motor, a second control valve connected to said one of the pumps and the other driving motor, said control valves when in a neutral position connecting said one of the pumps to one of the supply lines, the other pump being connected to the other supply line, and a third control valve to connect said other supply line to said other driving motor.

9. The hydraulic operating apparatus of claim 8 including a fourth control valve to interconnect the supply lines.

References Cited by the Examiner
UNITED STATES PATENTS

| | | | |
|---|---|---|---|
| 2,103,530 | 12/37 | Henry. | |
| 2,768,499 | 10/56 | Pilch | 60—52 |
| 3,005,562 | 10/61 | Shaffer | 60—52 X |
| 3,018,902 | 1/62 | Minty | 60—52 X |
| 3,032,994 | 5/62 | Lindel | 60—52 |

JULIUS E. WEST, *Primary Examiner.*